United States Patent [19]

Freeman et al.

[11] Patent Number: 5,591,256

[45] Date of Patent: Jan. 7, 1997

[54] HIGH PERFORMANCE SYNTHETIC ALKALI METAL ALUMINO-SILICATE, METHODS AND USES, COMPOSITIONS AND HIGH SOLIDS REACTION METHODS OF THEIR PREPARATION

[75] Inventors: Gary M. Freeman; Richard D. Carter; Thad T. Broome, all of Macon; Kurt H. Moller, Warner Robins, all of Ga.

[73] Assignee: J. M. Huber Corporation, Edison, N.J.

[21] Appl. No.: 288,532

[22] Filed: Aug. 10, 1994

[51] Int. Cl.$^6$ ................................................ C08K 5/00
[52] U.S. Cl. .................. 106/483; 106/416; 106/467; 106/468; 106/486; 106/487; 106/492; 423/118.1; 423/200; 423/328.2; 423/718; 428/328; 428/452; 428/453; 428/471; 501/144; 501/145
[58] Field of Search ...................... 106/416, 467, 106/468, 483, 486, 487, 492; 423/118, 200, 718, 328.2; 428/328, 452, 453, 471; 501/144, 145

[56] References Cited

U.S. PATENT DOCUMENTS

| 5,186,746 | 2/1993 | Freeman | 106/416 |
| 5,316,576 | 5/1994 | Freeman | 106/483 |

*Primary Examiner*—Mark L. Bell
*Assistant Examiner*—Scott L. Hertzog
*Attorney, Agent, or Firm*—Lowe, Price, LeBlanc & Becker

[57] ABSTRACT

Sodium alumino-silicates are produced by silicate/clay reactions under hydrothermal conditions with increased solids during processing while still producing structural materials characterized by low oil absorption values, high total pore volume and increased differential pore volumes. The products are useful as coating pigments for paper and paperboard, paper fillers, paint pigments and as reinforcing pigments for rubber.

29 Claims, No Drawings

HIGH PERFORMANCE SYNTHETIC ALKALI METAL ALUMINO-SILICATE, METHODS AND USES, COMPOSITIONS AND HIGH SOLIDS REACTION METHODS OF THEIR PREPARATION

FIELD OF INVENTION

This invention relates to novel and unique synthetic alkali metal alumino-silicate (SAMS) compositions and more particularly, to synthetic alkali metal alumino-silicates produced by an improved the hydrothermal reaction process of Kaolin clays with alkali metal silicates. The compositions have specific advantages as reinforcing extenders or functional pigments for paper, paints, rubber and polymer systems among its uses. The compositions are particularly useful in paper filling compositions and in paper coating compositions.

BACKGROUND OF THE INVENTION

Alkali metal silicate materials, such as sodium alumino-silicates are well known. The background is set forth in detail in U.S. Pat. No. 4,812,299 and further in U.S. Pat. Nos. 5,186,746, 5,316,576 and 5,112,402.

SUMMARY OF THE INVENTION

It is the object of the present invention to provide a new and highly effective SAMS, and method for making the same, which overcomes certain deficiencies of the prior art.

In particular it is a unique feature of the present invention to provide a SAMS composition having functional utility on a par with or exceeding the prior art while permitting production of the product at higher reaction solids and accordingly increased throughout rates. Thus the present invention provides a product of low oil absorption, high total pore volume and significantly increased differential pore volumes.

The advantages of the increased differential pore volume and of the higher solids process reaction will be discussed in detail in the body of the specification.

Other objects and a fuller understanding of the invention may be had by referring to the following description and claims taken in conjunction with the accompanying tables and drawing, if any.

An improved method for preparing high performance SAMS pigments with low oil absorption properties is disclosed. These products are produced by sodium silicate/clay reactions conducted under hydrothermal conditions as generally disclosed in U.S. Pat. Nos. 4,812,299 and 4,863,796. However, they represent a significant refinement in the art and can be thought of as a more preferred embodiment of the earlier patents. In particular, the products of this invention represent an anomaly to the prior art knowledge in that they offer superior performance properties, yet have low oil absorption values. In this invention, a refined concept of pigment pore structure as defined by differential pore volume (DPV) offers an improved understanding of pigment structure/optical property relationships versus that previously provided by just Total Pore Volume (TPV) analysis or oil absorption. Applying these principles, a select and unobvious combination of reaction parameters were identified and then utilized to yield sodium alumino-silicate pigments having some unique structural properties as follows:

1. A pore structure which has high total pore volume (on the order of 2.0 ml/gm in a preferred embodiment of the invention).
2. A relatively narrow pore size distribution that is centered near a pore diameter of 0.3 microns (which is the optimal porosity design for efficient scattering of visible light).
3. An oil absorption value that is less than 115 gm/100 gm despite their high pore volume content (this insures improved wet-out and slurry rheology properties).
4. A product particle size that falls within the range of 78–90% <2 microns (a 0.5–0.7 micron average stokes equivalent particle diameter) as determined by x-ray sedigraph.
5. A product having a differential pore volume equal to or exceeding 1.0 ml/gm.

It should be noted that many structured SAMS pigments of the prior art have total pore volumes equal to or greater than 2.0 ml/gm; but clearly failed to simultaneously meet the last four criteria as summarized above. To produce SAMS pigments having the unique total combination of structural properties set forth in this invention, several advancements in the hydrothermal reaction process had yet to be realized. Reactor solids have to be properly chosen for each sodium silicate Base/Clay combination to yield the required pore size distribution properties. Changes in the reaction solids of even 2%, very often have profound influences on the pigment structure. The importance of these reaction parameters was not recognized in the prior art processes.

It should also be noted that the preferred SAMS structural properties summarized above refer strictly to those determined on dispersed filter cake reaction product after conventional spray-drying. In contrast, once such dry products are subsequently made down into a high solids slurry product then a new set of unique physical property criteria apply, as follows:

6. A slurried product having a total pore volume (TPV) structure on the order of 1.5 ml/gm.
7. A slurried product particle size that fills within the average Stokes equivalent particle diameter range of 0.2–0.5 micron, as determined by x-ray Sedigraph.
8. A structured product slurry consisting of at least 50% solids wherein acceptable low-shear and high-shear viscosity properties are both exhibited (namely on 20 rpm Brookfield Viscosity of less than 800 cps and an A-Bob/1100 rpm Hercules Viscosity no worse than 18+/400 rpm).
9. A slurried product whose resulting pore structure has a relatively narrow pore size distribution that is centered near a pore diameter size of 0.3 microns.
10. A slurried product having a differential pore volume (DPV) structure of a least 0.5 ml/gm.

Many structured SAMS pigments of the prior art can be made down into slurry products that meet criteria 6 and 7 as described above, but which clearly fail to simultaneously satisfy all five property conditions. In general, the spray-dried SAMS products which satisfy all the structural properties set forth in criteria 1–5 are the ones that have the inherent ability to yield acceptable high solids slurry products (as defined by criteria 6–10).

In summary, the present invention produces at an enhanced reactor thoughput rate and a spraydried product having a total pore volume somewhat lower than that of U.S. Pat. No. 5,186,746. But the SAMS product of the present invention has a differential pore volume (DPV) higher than that of U.S. Pat. No. 5,186,746.

In order to fully appreciate the present invention it is necessary to understand the concept and importance of differential pore volume (DPV) as a structure parameter. Differential pore volume has been discovered to be a better predictor of pigment opacity than total pore volume, oil absorption, or wet cake moisture. Differential pore volume (DPV) refers to and is by definition that portion of the total volume of pores, as measured by mercury intrustion, which reside in that range of pore diameter most optically of interest with regard to opacity, namely the range from 0.1 to 0.4 micron in size. Pores in the DPV range are most optically efficient with regard to providing opacity since their size is approximately one half the wavelength of visible light.

Even in cases where the total pore volume that one might associate with the products of U.S. Pat. No. 5,186,746, typically 2.9 ml/gm, is decreased by the reaction process of the present invention to about 2.5 ml/gm—(on the border line of medium to high structure) the higher differential pore volume (DPV) of the SAMS yielded by the present invention of about 1.1 ml/gm is sufficient to provide the same level of, or even increased, opacity. The DPV values associated with the preferred SAMS products of U.S. Pat. No. 5,186,746 were, in comparison, about 0.8–1.0 ml/gm despite their frequently higher TPV.

The decrease in total pore volume (TPV) from say 2.9 to 2.5 ml/gm yields a significant benefit in the product's slurry, make down theology. This improvement yields a 25% increase in make down efficiency throughput, i.e. from 4 T/hr to 5 T/hr, at 50% slurry solids. A 40% increase in reactor throughput efficiency is the net result of our ability to run higher reactor solids given ensuing products of lower TPV structure. While with 20/20 hindsight the make-down effect may be seen as related to the reduction in total pore volume (TPV), and the related structure, the combination of this effect with the gain in differential pore volume (DPV) resulting in increased opacity is totally unexpected.

As will be seen herein after, the maintenance of the desired particle size range while running at higher reactor solids concentrations is obtained primarily by running at lower temperatures and pressures than those taught by U.S. Pat. No. 5,186,746. The increase from, for example, 10% solids to 14% solids yields a 40% solids increase which, ultimately translates to a 40% productivity increase and through the low temperatures employed, lower total energy costs. In contrast with the 100 psi+temperatures and pressures of the prior art, the present invention employs temperatures and pressures under 100 psi and most typically on the order of 70 to 75 psi.

In the case of 50% solids slurries produced from said products the total pore volume (TPV) of the present invention remains at 1.5 to 1.6 ml/gm while the differential pore volume (DPV) is on the order of 0.5 to 0.8 ml/gm.

In order to facilitate the understanding of the present invention, reference will now be made to the tables. The tables should not be construed as limiting the invention, but rather as being exemplary only.

Table-1A: A study of Sodium Silicate/Hydragloss 90 Clay Reactions conducted under Hydrothermal Conditions Table-1B: Pigment Structure Definition as based on total pore volume*

Table-1C: SAMS Products Illustrative of the Invention of U.S. Pat. No. 5,186,746

Table 2: Low Oil Absorption SAMS* produced from various clay feedstocks

Table 3: I. Influence of Reaction Solids

Table 4: Scale-Up of Low Oil Absorption SAMS Products

Table 5A: Comparison of Typical Properties: Commercial-Scale SAMS Products vs Hydragloss 90 Feedstock Table 5B: The Effect of Reactor Steam Flow on SAMS Product Formation Table 6: (Not Presented)

Table 7: Comparative Reaction Parameters and Physical Properties for SAMS Structured Pigments Table 8A: Drawdown Results of Board Coating Formulations Table 8B: Results from laboratory pilot coater

DESCRIPTION OF THE INVENTION

The following is a description of a preferred embodiment of the present invention.

Preferred Embodiments

The present invention is further illustrated by the following examples, which should be regarded as demonstrating only some of the preferred embodiments and not limiting them.

In the examples, reference is made to the following trademarked products:

(1) Hydragloss™ 90—a fine particle size, refined East Georgia clay product useful as a high glossing paper coating pigment, the 90 indicating a GE brightness of greater than 90, available from J. M. Huber Corporation.

(2) SAMTONE 581—a SAMS type paper filler available from J. M. Huber Corporation.

(3) Hydragloss™—fine particle size, East Georgia refined clay used as a paper coating pigment, available from J. M. Huber Corporation.

(4) Hydrafine™ 90—Delaminated fine particle size clay useful as paper filler or coating pigment, available from J. M. Huber Corporation.

(5) Hydrasperse™ 90—a high brightness, #2 refined Georgia clay useful as paper filler or coating pigment, available from J. M. Huber Corporation.

(6) Ansilex 93—a high brightness calcined clay useful as paper filler or for paper coating, available commercially from Engelhard Corporation.

(7) Omnifil™ clay—a low brightness, fine particle East Georgia clay used as a filler and coating pigment, available from J. M. Huber Corporation.

The Sodium Alumino-Silicate products of the present invention are characterized by the following empirical formula in terms of oxide constituents:

$$(0.01-0.5)Na_2O: Al_2O_3: (2.01-3.0)SiO_2: (1.0-3.0) H_2O,$$

by having an oil absorption capacity of less than 115 gm/100 gm while simultaneously possessing a total pore volume of at least 2.0 ml/gm, but more preferably about 2.5 ml/gm, and wherein the pigment pore volume will consist entirely of pore diameter size between 0.2 and 0.7 microns, more ideally near 0.3 microns. In terms of differential pore volume (DPV), the products of this invention will have at least 1.0 ml/gm. The preferred products of this invention are produced using a carefully controlled combination of reaction conditions utilizing the following batch reaction mixture: (0.2–0.5) $Na_2O$: $Al_2O_3$: (2.30–2.83) $SiO_2$, a molar ratio of sodium silicate (B) to clay (C) in the reaction mixture of 0.2:1 to 0.3:1, and sodium silicate base having a $SiO_2/Na_2O$ mole ratio composition of about 2.1. Medium mole ratio sodium silicates are defined as having $SiO_2/Na_2O$ mole ratios ranging from 2.0–2.5.

The present invention also provides desirable paper products containing the SAMS products of this invention as coating pigments and paper fillers. The coating pigments and paper fillers of this invention are used in accordance with procedures known to the art. The products of the invention are also useful in paints as pigments for both oil-based and water-based paints. The products of the invention are also useful as rubber pigments to provide reinforcement.

The present invention also provides an improved method for the preparation of the novel products by the reaction of sodium silicate with clay under hydrothermal conditions wherein the molar ratio of B (sodium silicate) to C (clay) ranges from 0.2 to 0.3 with the use of medium mole ratio sodium silicates and further provided that the batch composition during the reaction will be expressed by the following stoichiometric ranges:

(0.2–0.5) $Na_2O$: $Al_2O_3$: (2.30–2.83) $SiO_2$ and recovering the product.

EXAMPLE 1

Control

In this example, as a control, a systematic study of SAMS products prepared from sodium silicate/Hydragloss™ 90 reactions conducted under hydrothermal conditions was undertaken. The complete matrix of reactions investigated is summarized in Table 1-A. As shown there, sodium silicate reagents ranging in $SiO_2/Na_2O$ mole ratio compositions from 3.33 to 1.0 were studied at various B/C molar ratios.

In all cases, the SAMS reactions of Table 1-A were conducted at 12% solids in a 2-gallon laboratory Parr Reactor using 120 psig (172° C.) conditions over a one-hour cook period and a constant mixing speed of 250 rpm. The total reaction batch weight always equalled 5600 gm. On that basis, for example, the reaction of N-silicate with Hydragloss™ 90 clay at a 0.1 B/C molar ratio required the following batch recipe:

Step 1 610.05 gm of active Hydragloss 90 spray-dried clay was made down in water at 50 % solids using a Waring blender.

Step 2 A Sodium silicate solution was prepared by combining 164.8 gm of N-silicate reagent (as received) and 4215.1 gm of water.

Step 3 The Hydragloss 90 clay slurry and sodium silicate solution were combined, mixed well and then charged to the Parr reactor for subsequent heating at 175° C.

The remaining reactions outlined in Table 1-A were put together in a fully analogous fashion. Upon completing the one hour cook period at 120 psig (172° C.), each product slurry was cooled to about 65° C. and filtered on a Buchner funnel. The filter cake material was washed with three volumes of water and subsequently re-dispersed under low shear at approximately 20% solids for spray-drying in a Nichols Model 53 dryer. The spray-dried products were then subjected to a full battery of physical property tests, such as percent brightness, sedigraph particle size, oil absorption and pore volume analysis by mercury intrusion. The mercury porosimetry data, in particular total pore volume and pore size distribution, are important in accessing the potential optical functionality of structured SAMS pigments.

A better understanding of property/structure relationships in SAMS products may be gained by collecting total pore volume and pore size distribution information by mercury intrusion and comparing structural characteristics on that basis. The gross structure level of a SAMS pigment is defined here on the basis of its total pore volume (see Table 1-B for the various structure classifications). From prior art optical considerations, it follows that the total pore volume and particularly the pore size distribution of a given microvoid structure should be related to overall pigment performance. Optical theory indicates that for a porous medium of 1.5 refractive index that microvoids of 0.2–0.7 micron diameter are needed for efficient scattering of visible light. Optimal scattering efficiency is provided by microvoids of uniform 0.3 micron diameter. Working under these theoretical premises, a class of unique SAMS compositions exhibiting enhanced performance properties can be engineered by the proper selection of various reaction parameters. Important SAMS reaction parameters include the following:

Hydrous clay feedstock (starting particle size)

Molar ratio composition of sodium silicate

Base/Clay molar ratio

Reaction Time

Reaction Solids

Reactor mixing intensity

Steam addition profile

In particular, the specific influence of percent reaction solids on SAMS structure and particle size properties was not recognized in the prior an processes. These process related points will be illustrated in more detail in later examples. In short, however, it may be said that the present invention provides SAMS compositions and improved methods for their preparation which are unique and whose performance properties would be unexpected in view of the prior art knowledge.

The general physical property criteria used to describe SAMS compositions of this invention are as follows:

The SAMS products, as a spray dried filter cake material, will have an oil absorption capacity less than 115 gm/100 gm, while simultaneously possessing a total pore volume of at least 2.0 ml/gm, but more preferably about 2.5 ml/gm. To offer good optical performance, SAMS structured pigments must contain a total pore volume of at least 2.0 ml/gm. The high pore volume of such products enhances the optical efficiency of various paper and coating systems by increasing the number of microvoids present to scatter visible light.

In a more preferred embodiment of the present invention, SAMS pigments with an oil absorption less than 115 gm/100 gm possess a total pore volume of at least 2.0 ml/gm but wherein the pigment pore volume consists entirely of pore diameters sized between 0.2–0.7 micron or more ideally near 0.3 micron. Based on optical considerations, microvoids having diameters comparable in size to the wavelength range of visible light should be the most efficient light scatterers. On this basis, the matrix of reactions suited to yielding SAMS pigments of superior optical performance is reduced considerably in scope. A representative set of SAMS reactions meeting these structural criteria, along with their respective physical property values, are listed in Table 1-C. The silicate plus Base/Clay ratio combinations producing preferred SAMS product compositions can therefore be generally summarized as follows:

| SODIUM SILICATE TYPE | REQUIRED B/C MOLAR RATIO |
|---|---|
| For high mole ratio silicates(N @ 3.33 $SiO_2/Na_2O$) | 0.2 |
| For medium mole ratio silicates(D&RU, from 2.0–2.5 $SiO_2/Na_2O$) | 0.2–0.3 |
| For low ratio silicates(meta & BW, from 1.0–1.7 $SiO_2/Na_2O$) | 0.3–0.5 |

For the above SAMS reactions, the associated batch compositions can be generically expressed by the following stoichiometric ranges:

(0.2–0.5) $Na_2O$: $Al_2O_3$: (2.30–2.83) $SiO_2$

This scheme is intended to be a general guideline on preferred sodium silicate plus B/C ratio combinations rather than an absolute one, since other reaction parameters do have some influence on resulting pore structure properties as well. To better understand the inter-dependent relationship between sodium silicate mole ratio composition and B/C reaction ratio as pertaining to SAMS pore structure, one has to only examine the pore size distribution curves of FIGS. 1 and 2 respectively of U.S. Pat. No. 5,186,746. The pore size distribution broadens significantly towards larger pore diameters as the sodium silicate mole ratio composition was increased from 1.0 to 3.33. A similar systematic broadening of pore size distribution towards larger pore diameters can also be observed as higher B/C reaction ratios are employed.

In a preferred embodiment of U.S. Pat. No. 5,186,746, SAMS pigments having an oil absorption less than 115 gm/100 gm would possess a total pore volume exceeding 2.5 ml/gm wherein the pores would have nearly uniform pore size diameter of 0.3 micron for providing optimal light scattering properties. A base/clay reaction ratio of about 0.3 using a sodium silicate having a $SiO_2/Na_2O$ mole ratio composition of 2.0–2.5 preferred. However, it should be noted that the SAMS products of Table 1-C, having been produced under 120 psig (172° C.) reaction conditions, exhibited differential pore volume (DPV) values in the range of 0.8–1.0 ml/gm.

EXAMPLE 2

Control

This experiment/example also presented as a control illustrates the significant influence that clay feedstock particle size has on resulting SAMS product properties. Low oil absorption SAMS products were prepared from four different hydrous clay feedstocks. The clay feedstocks varied in average Stokes equivalent particle diameter between 0.2 and 0.7 micron. The clay feedstocks examined represent an assortment of Number 1 and Number 2 type hydrous clay products currently marketed by J. M. Huber under the trade names Hydragloss 90, Hydragloss, Hydrafine™ 90 and Hydrasperse™ 90.

For each clay feedstock, an analogous SAMS product was produced using a 2-gallon laboratory Parr reactor. The reactions utilized D-silicate (2.06 mole ratio composition) with the appropriate hydrous clay at a B/C molar ratio of 0.2 and 14% reactor solids. The reactions were subjected to a 120 psig (172° C.) cook over one hour using a Parr mixing speed of 150 rpm. For a total batch weight of 5600 gm, this required 6852 gm of active spray-dried clay (subsequently made down to 50%solids) to be combined with 224.0 gm of D-silicate reagent (as received) and 4,005.6 gm of dilution water to yield the desired reaction stoichiometry. The reaction products were filtered, washed and spray dried as described previously.

The physical properties of the various SAMS pigments (see Table 2) indicate substantial changes in pore structure and final particle size as a function of the initial clay feedstock particle size. As the average particle size of the clay feedstock increased, there was a corresponding increase in the SAMS product particle size. At the same time, the pigment pore volume was observed to decrease and the pore size distribution shifted towards larger pore diameters. It is very interesting to note that the maxima associated with the pore size distribution curves occur at diameter sizes that closely match the average Stokes equivalent particle diameter values determined for the initial clay feedstocks. Based on the optical/light scattering concepts, it is apparent that clay feedstocks of 0.2–0.6 micron average particle diameter should be utilized to produce SAMS products with preferred properties. Feedstocks of 0.2–0.3 micron average particle diameter are most highly preferred. SAMS pigments offering microvoids of uniform 0.3 micron diameter are expected to be the most optically efficient.

EXAMPLE 3

Control

As a further control example, the influence of reaction solids and reactor mixing intensity on SAMS structure properties are examined respectively. D-Silicate (2.06 mole ratio) was utilized at a Base/Clay molar ratio of 0.3. The D-Silicate/Clay reactions were conducted in a 2-gallon laboratory Parr reactor using a 120 psig (172° C.) cook over 1 hour. Specific details concerning the other reaction parameters (such as percent reaction solids, hydrous clay feedstock, and/or Parr mixing intensity) are summarized accordingly in Table 3. All reaction batches were based on a total reactor charge of 5600 gm. The reaction products were also filtered, washed and spray-dried as previously described.

In Part One of this example, Omnifil based SAMS products were produced at different reaction solids ranging from 10–16%. The physical properties of these reaction products indicate substantial changes in pore structure as well as final particle size as the reaction solids were changed (see Table 3). As the reaction solids were systematically increased from 10 to finally 16% solids, there was a corresponding increase in the SAMS product particle size. At the same time, the pore size distribution was observed to broaden somewhat towards pore sizes of greater diameter. Broadening of the pore size distribution was the result of bimodal pore character being formed as higher reaction solids were used.

In Part Two of this example, Hydragloss 90 based SAMS products were produced at 14% reaction solids but wherein Parr mixing intensities ranging from 150 to 350 rpm were examined. The physical properties of these SAMS products indicate that structural changes do occur as the mixing intensity was varied. As the Parr mixing speed was increased from 150 to 250, and then finally to 350, rpm, there was a corresponding increase in the SAMS product particle size (see Table 3). At the same time, the pigment total pore volume was being substantially decreased while oil absorption capacity was actually increased. Using minimal mixing speeds to increase pigment pore volume and to lower oil absorption capacity, is an important aspect of our SAMS reaction process. Slower mixing speeds were also preferred from the standpoint of yielding SAMS products of finer particle size (around 85% —2 microns is preferred).

EXAMPLE 4

Control

Using the reaction parameter concepts discussed in Examples 1–3 (concerning sodium silicate type and B/C ratio selection, as well as percent solids, mixing intensity and clay feedstock requirements) preferred products of this invention were produced using a 250-gallon Pilot scale reactor. This high pressure reactor was equipped with a 17-inch diameter marine style impeller having variable speed capability and, in contrast to the laboratory Parr reactor, was heated entirely by internal steam sparging rather than by an external heat source. Hydrothermal reactions of Hydragloss 90 clay with D-Silicate and the Meta-Silicate were conducted, respectively, in accordance with the conditions outlined in Table 4. Reactions #1 and #2 with D-Silicate were identical except for a change in reactor mixing intensity. Final reaction solids at operating temperature and pressure were approximately 10%. After completing the cook period, the product slurry was discharged to a drop tank and subsequently diluted with 190 gallons of fresh water. The hot slurry (65° C.) was then filtered using a rotary vacuum string discharge type filter equipped with an accessory wash blanket so as to wash the filter cake material to a conductivity value of 400 Mhos or less. The wash blanket was required to lower product conductivity (by removing soluble alkali) and to obtain the maximum product brightness. The SAMS filter cakes were re-dispersed at approximately 22% solids using low shear mixing and subsequently spray-dried for testing work. The physical properties of each product are also summarized in Table 4. The very high total pore volume (greater than 2.5 ml/gm) of each product should be noted. A higher mixing intensity produced a SAMS product of coarser particle size.

In terms of sheet opacity, filler data indicate that the two SAMS products of finer particle size (i.e., #1 and #3) offer equivalent, if not generally superior, performance to Ansilex 93 calcined clay. The #1 SAMS pigment also provided comparable brightness and whiteness values versus the calcined clay. Despite their similarities in pore structure, pigment #2 provided reduced opacifying properties across the board versus SAMS pigments #1 or #3. This performance drop can be attributed to the much coarser particle size of pigment #2. On this basis, the preferred average particle diameter size range for spray-dried SAMS products is 0.5–0.7 micron (by Stokes Law).

EXAMPLE 5

Control

In this study, the #1 reaction product of Example 4 was appropriately scaled up to a 7200-gallon high pressure reactor. A full scale production run was commenced wherein water, 31,934 lbs., and D-sodium silicate, 2,040 lbs. (as received), were added to the reactor. The D-silicate reagent has a $SiO_2/Na_2O$ mole ratio composition of 2.06 and is 44.1% active. Next, 8,015 pounds of Hydragloss 90 dispersed filter cake slurry at 51.9% solids were added. The reactor contents were continuously mixed by a mechanical agitator turning at 8 rpm (180.1 fpm tip speed) and heated to a final temperature of 175° C. (130 psig) using live steam. The steam addition was accomplished by employing an internal steam sparget system. Upon reaching our operating temperature and pressure, the reaction solids had reached 10%. After heating the reaction batch at 130 psig for a total of 65 minutes, the resulting product slurry was vented into a drop tank and subsequently filtered, washed with water, redispersed and then spray-dried to a moisture content of approximately 3%. In analogy with the pilot scale work, a string discharge rotary vacuum filter equipped with an accessory wash blanket was used to yield wet filter cake material having a conductivity value of 400 mhos or less. From experience we have determined that a conductivity value of 400 mhos insures that sufficient product washing has occurred to achieve the maximum possible product brightness. Given the amounts of D-silicate, Hydragloss 90 clay and water employed in this hydrothermal process, the reaction batch composition can be described as having a Base/Clay molar ratio of 0.3 at 10% solids or alternatively, in terms of the oxide constituents, as:

$$0.30\ Na_2O: Al_2O_3: 2.62\ SiO_2: 159\ H_2O$$

when normalized with respect to the $Al_2O_3$ molar content. Our reaction product was evaluated and characterized by various test methods. The chemical and physical properties of this SAMS product are summarized in Table 5-A. Generically, the product can be described as a sodium aluminosilicate composition. The specific composition for the preferred SAMS product of this invention can be expressed in terms of its oxide constituents as:

$$0.15\ Na_2O: Al_2O_3: 2.34\ SiO_2: 2.0\ H_2O.$$

In more general terms, the range of SAMS compositions within the scope of this invention is:

$$(0.01–0.5)\ Na_2O: Al_2O_3: (2.01–3.0)\ SiO_2: (1.0–3.0)H_2O.$$

A $SiO_2/Al_2O_3$ mole ratio range of 2.01–3.0 is clearly unique compositionally versus the prior art.

A critical feature of the reaction process to produce the SAMS in this example involves the careful regulation of steam flow used in bringing the reactor contents up to 130 psig (175° C.). Table 5-B summarizes the hydrothermal conditions needed to produce the desired SAMS product (target particle size equals 85% —2 microns). In an earlier production run, a coarse particle size SAMS product (70% —2 microns) was produced when a linear pressure-up profile covering 27 minutes was employed. This particle size problem remained despite further adjustments in the reactor's mechanical mixing intensity. In this reaction, downward adjustments in mixing speed below 8 rpm did not provide further decreases in SAMS product particle size. Consequently, a new pressure-up profile of reduced slope was established that extended the reactor's ramp-up time out to 35 minutes. This strategy was accomplished by setting a 55 psi intermediate pressure point whereat the steam injection flow was rapidly reduced by approximately 50% using an automated steam flow control valve system. These changes acted to slow down the reaction associated with aggregate formation and thereby yielded a SAMS product of finer particle size. Laboratory studies have shown that the particle size of SAMS products are largely established during the pressure-up phase and little if any changes occur after approximately 15 minutes into the cook period. It is therefore not surprising that changes in steam flow influence particle size formation. The importance of steam addition rate in controlling particle size was not recognized in the prior art production process.

A medium of 1.5 refractive index containing microvoids of uniform 0.3 micron diameter should provide optimum light scattering efficiency for visible light. Total pore volume and pore size distribution, as determined by mercury intrusion, provide a basis for a more universal explanation of SAMS structured pigment performance than oil absorption measurements.

SAMS appear in SEM photographs to be structured agglomerants composed of small flat platelets. SAMS contain remnants of altered clay platelets having an integrated rimmed area of amorphous non-diffracting alkali metal silicate-kaolin reaction product. By the term "rimmed", it is meant that the altered primary particles are comprised of a core material having an integral border or outer edge material of different constitution from the core. The primary particles are generally in the form of lamella (irregular to pseudo-hexagonal shaped plates). The rim is an outer edge or border which usually substantially encompasses the plate perimeter. By the term "amorphous" it is meant that the material does not have a characteristic x-ray diffraction pattern.

EXAMPLE 6

Control

A makedown process is disclosed for preparing a SAMS structured pigment slurry offering high performance properties and having a 50% minimum solids. In a production scale trial, a structured pigment slurry derived from the low oil absorption SAMS of Example 5 was produced using a high shear Cowles, continuous makedown type process. In the makedown, a spray-dried 95/5 composite blend of SAMS/Hydragloss 90 was used for building slurry solids directly in a continuous fashion. The makedown system consisted of a 700-gallon Cowles wet-out tank used in sequence with a second Cowles mix tank of 3,000-gallon capacity. The composite slurry leaving the Cowles tank was then pumped by means of an air diaphragm pump to a large, agitated storage tank capable of holding several tank cars of product.

The wet-out tank in our process was equipped with a 200 horsepower Cowles that was operated at a tip speed of 4300 fpm (3:1 tank to blade diameter ratio and no baffles). The larger mix tank was equipped with a 350 horsepower Cowles that was operated at a tip speed of 5000 fpm (4:1 tank to blade diameter ratio plus baffles). The additional high shear mixing received in this second Cowles tank was very important as it improves product dispersion and lowers Hercules viscosity. Typically, the product throughout rate averaged 4.0 dry tons/hour.

The slurry and spray-dried feedstocks utilized in this makedown process were prepared as follows. In a 150,000-gallon storage tank, 146,900 gallons of SAMS Example 5 (as dispersed filter cake slurry of 22.0% solids) was blended with 2550 gallons of 52.2% solids Hydragloss 90 dispersed filter cake slurry to yield a 95/5 dry weight ratio composite pigment slurry. This filter cake slurry blend represented 163.6 dry tons of composite pigment at 22.6% total solids. The amount of Daxad 30 organic dispersant totaled 0.03% (on active polymer basis). Approximately 75% of our filter cake slurry blend was spray-dried using typical commercial drying conditions. The dry composite pigment was then used in combination with the remaining filter cake slurry blend to yield a final slurry product of 50% solids.

Combining the dry and slurry feedstocks was accomplished by simultaneously feeding them into the Cowles wet-out tank at rates of 98 lb/min. and 16.5 gal/min., respectively. The dry composite pigment was metered in by means of automated dry bin/feeder system. The above feed rates translate to the formation of a 95/5 composite slurry having about 52% solids at a continuous through-put of 4.0 dry tons/hour. The makedown process was continued until 150 dry tons of slurry product had been produced (solids were verified by a specific gravity check to be 52.0%). With all the slurry product now in the large storage tank, solids were reduced to 50.0% with water and the viscosity values determined. At this juncture, the Brookfield (20 rpm) and Hercules (A-Bob) viscosities were 180 centipoise and 18+/655 rpm respectively.

A polymeric thickening agent, preferably an alkali soluble acrylic polymer emulsion, like Acusol 820, maybe employed to improve pigment suspension properties. Good pigment suspension properties are needed when slurries are to be shipped long distances in bulk by a tank car. To the 150 dry tons of slurry produced from the original makedown process, Acusol 820 polymer was subsequently added. The polymer was incorporated by means of a tank recirculation line equipped with an injection port/in-line mixer combination. In total, 180.0 active pounds of Acusol 820 was added (0.06% by weight) to yield a final slurry product having a Brookfield (20 rpm) viscosity of 660 centipoise and a Hercules viscosity (in Dynes) of 18+/640 rpm using the A-Bob. The slurry product thereby exhibited good stability properties over a 4-week time period and can be pumped by customers using ordinary centrifugal type pumps. Achieving a 50% solids structured pigment slurry having good stability and pumpability properties was an important objective of this work.

EXAMPLE 7

As the above examples teach, the benefits of increasing SAMS reactor solids are contraindicated in the fact that product particle size is frequently increased beyond the desired optimum range of 0.5–0.7 micron as defined in terms of average Stokes equivalent particle diameter. Furthermore, increasing SAMS reactor solids above 10% can act to broaden the product's pore size distribution towards pore sizes of greater diameter than the desired 0.3 micron, which in most cases is the consequence of bimodal pore size character being formed under these conditions. Neither of these structural trends is desirable with respect to producing SAMS pigments that yield optimum opacifying properties whether they are spray-dried or subsequently made down into high solids slurry products. The detrimental effects of running at higher reactor solids were seen with all combinations of sodium silicate base and B/C reaction ratio. These effects can therefore not be overcome strictly on the basis of a select batch composition. Nevertheless the ultimate desire to run at higher reactor solids is fueled by the potential production throughput gains that might be realized from such a process.

In contrast to the teachings of U.S. Pat. No. 5,186,746, it has been discovered that it is in fact possible to increase SAMS reactor solids from 10% up to as high as 16% without suffering any of the deleterious structural effects previously seen. The net result of this process improvement is an increase in plant production capacity without additional capital investment while simultaneously decreasing energy costs and slurry makedown requirements. The fundamental product discovery that enabled the development of an improved reaction process involved us recognizing the importance of differential pore volume as a predictive structure/property concept. In short, differential pore volume (DPV) is the amount of pigment pore volume present that has pore sizes ranging from 0.1 to 0.4 micron in diameter (as measured in ml/gm by mercury intrusion porosimetry). Although (TPV) total pore volume data in combination with defining the pore population maxima within the entire pore size distribution are useful in describing the structure/property characteristics of aggregate pigments like SAMS, we have experimentally determined that DPV values are more predictive with respect to a pigment's optical efficiency in paper filler and coating applications. Pigment pore structure having a pore diameter of around 0.3 micron in size is the most optically efficient with regard to scattering visible light since it is approximately one half the average wavelength of visible light. The DPV parameter thereby helps us to better quantify the amount of optically efficient porosity that is present. Once it was recognized that DPV rather than TPV was the more important structural parameter with respect to a pigment's inherent optical efficiency, then SAMS reaction conditions which maintained or improved DPV values were sought out and explored even if they resulted in some modest decrease in the pigment's TPV value. The net result of these process investigations was the discovery of a set of reaction conditions that not only allowed the DPV of our SAMS products to be improved to values exceeding 1.0 ml/gm, but simultaneously allowed us to improve SAMS production output by running higher solids reactions. Some of the factors that must be considered to successfully run reactions at higher solids and thereby produce the preferred SAMS products of this invention are discussed below.

It should be noted that the SAMS reaction process, which results in clay platelet alteration and in the bonding of these clay particles into structured aggregates, is kinetically controlled. Actually, the processes of clay platelet alteration and of clay platelet aggregation are two separate reaction pathways that have different reaction rates. Clay platelet aggregation occurs more rapidly than alteration and as a result the particle size of SAMS products are largely established during the pressure-up phase with little if any changes occurring during the actual cook period. It is believed that aggregate formation is the result of amorphous silica/silicates being precipitated at the positively charged edges of the clay platelets resulting in the observed "rimming" effect and subsequently acting as an inorganic type binder between particles. On the other hand, clay platelet alteration occurs slowly and involves the destruction of the kaolin crystal structure through the digestive action of the caustic alkali content. This kaolin alteration process is important ot achieving improved product brightness and to remove enough excess alkali from the batch to allow the SAMS product to be readily filtered. The presence of large amounts of unreacted alkali can hurt SAMS filtration rates by acting as a chemical dispersant. Recognizing that the SAMS process is kinetically controlled, indicates that temperature and that reactant concentrations are both key parameters in controlling the reaction rate. Factors that increase the rate of chemical aggregation lead to SAMS products of increased particle size and having larger pore diameters than desired. Consequently, a key aspect of the present invention is the preferred utilization of lower temperature/pressure conditions than taught in U.S. Pat. No. 5,186,746 as a direct means to offset the kinetic rate effects realized from raising the reaction solids. The prior SAMS art has in general utilized reaction pressures at or above 100 psig, with operating conditions of 120–130 psig (172–175 deg C.) being most commonly employed. In contrast, the SAMS reactions of this invention require temperature/pressure conditions lower than 100 psig, with 70 psig (150 deg C.) reactor conditons being most highly preferred. The preferred silicate/clay batch composition used in this new low pressure reaction process is the same as that described in Example 5 (above and in U.S. Pat. No. 5,186,746) except that total reactor solids are increased to about 14%. The ability to run lower temperature/pressure conditions as a consequence of higher reactor solids helps to reduce overall energy costs.

Another factor which may be employed in tailoring the products of the present invention is the reactor mixing intensity. The more mechanical agitation that is supplied by an internal mixer during the pressure ramp-up phase the coarser the resulting SAMS particle size. This happens because the rate of reaction in a heterogeneous system (such as what occurs in SAMS) is often driven by the speed at which the soluble (i.e., silicate) and insoluble (i.e., clay) reactant phases are physically brought together by mechanical means. In accordance with the present invention it is desired to keep the degree of mechanical agitation low during the ramp-up of reaction batches conducted at increased solids. Similarly, establishing a slower pressure-up profile that extends the reactor's ramp-up time from about 35 minutes to about 45 minutes is critical to reducing the reaction rate during the time when chemical aggregation of clay platelets is principally occurring. The slower pressure-up profile reduces the SAMS reaction rate in two ways: 1) by decreasing the level of internal agitation being supplied by live steam flow via the internal steam spargers, and 2) by decreasing the rate at which heat is being transferred to the reactants. Although this aspect of the improved SAMS process may at first blush appear contrary to the above claims of improved production output, what is more important is the total duty cycle of the reaction process. By reacting at solids of 13–16%, it has been determined that the "cook period" can be reduced from the traditional 60–65 minutes to about 45 minutes such that the total duty cycle is unaltered or slightly reduced in time. The desired SAMS brightness and desired degree of clay alteration are still obtained with the shorter "cook period" conducted at a lower temperature/pressure because of the increased rates of alkali/clay alteration obtained at higher solids contents. It is to be noted that the increasing of SAMS reactor solids, while maintaining or slightly improving total duty cycle times, results in a net increase in production throughput. Furthermore, total production costs are reduced by decreasing energy requirments as a consequence of employing a significantly lower operating temperature/pressure and by having less water present to heat per reactor batch. SAMS production costs (on %/ton basis) are also reduced as a consequence of the increased product throughput by spreading fixed maintenance and capital depreciation costs across a greater number of tons.

In regards to the prior art, increasing SAMS reactor solids above 10% is not per se a process problem. However, U.S. Pat. No. 5,186,746 did not teach how to simultaneously maintain the product's particle size and pore structure in the desired range for yielding optimum optical properties in paper and coatings applications while pushing reactor solids upwards. U.S. Pat. No. 5,186,746 also does not teach the importance of raising reactor solids with regards to increasing product throughput and thereby decreasing production costs. In addition, this prior art did not recognize the importance of combining higher solids with lower temperature conditions as a means to produce with a DPV exceeding 1.0 ml/gm). The advantages of the present invention are further illustrated in the following example:

The analogous batch recipe of Example 5 was used wherein Hydragloss™ 90 clay was reacted with D-silicate at a B/C molar ratio of 0.3 except that total reactor solids were now increased from 10% to about 14%. Furthermore, the present reaction was conducted at 70 psig (150 deg C.) using an extended pressure ramp-up time of 45 minutes and a cook period of only 45 minutes. The resulting SAMS product was vented into a drop tank and subsequently filtered, washed, redispersed and then spray-dried as previously described. Table 7 summarizes the reaction parameters needed to produce this improved SAMS product as well as its important physical properties. The reaction parameters and properties of the SAMS product of Example 5 (from above) are also provided for comparative purposes.

The data of Table 7 clearly indicate that a net increase in SAMS product throughput on the order of about 40% was obtained by operating the reactor in accordance with the preferred aspects of this invention. It is also interesting to note that the resulting SAMS product had an improved DPV value relative to that produced via the prior art process (1.1versus 0.9 ml/gm, respectively) despite having undergone a slight reduction in TPV. Evaluation of this new SAMS showed equivalent to superior opacifying properties relative to that of the control product from Example 5 and superior makedown rheology characteristics in the production of a high solids slurry product.

EXAMPLE 8

In this experiment, the superior slurry makedown characteristics of the dry SAMS product produced in Example 7 (i.e., product B of Table 7) are demonstrated using a production scale Cowles makedown system. The high shear Cowles, continuous makedown system previously described in Example 6 was once again employed. In our trial run, a 95/5 composite blend of the SAMS filter cake product from Example 7 with Hydragloss 90 was produced to serve as starting slurry blend and as spray-dried feed for building solids. The makedown run was then conducted in analogy to that described in Example 6 except that a 25% improvement in product throughput rate at 50% solids was now obtained without taxing the amperage limits of the two Cowles Dissolver units. This 25% rate increase translates to an additional SAMS makedown capacity of about 1 dry ton/hour (i.e., an increase from 4 dry tons/hour to about 5 dry tons/hour). The greater ease at which the new SAMS product was made down to 50% solids is most likely the consequence of its decreased total structure level (TPV) which probably helped to decrease the dilatant characteristics of the product. However, the final slurry product was found to have virtually equivalent particle size and pore structure properties to the slurry control, with values for its Malvern median particle size, TPV and DPV being 0.95 micron, 1.55 ml/gm and 0.54 ml/gm, respectively. Historical slurry makedown values for the commercial Sampaque 5002 product (the SAMS of Examples 5 and 6) have been in the range of 0.8–1.2 microns, 1.50–1.60 ml/gm and 0.5–0.6 ml/gm, respectively, when slurried to about 50% solids.

EXAMPLE 9

The SAMS product of Example 7 was subjected to various applications tests to confirm its titanium dioxide extension capabilities. In each case the extension of titanium dioxide was found to be equal to or superior to that of the products of U.S. Pat. No. 5,186,746. Specifically LWC/offset paper coatings applications were examined in which up to five parts of the titanium dioxide pigment were replaced by the SAMS product of Example 7. Both five particle clay and clay-carbonate type coatings formulations were examined.

Sheet opacity, brightness and smoothness were all maintained, while printed gloss was improved in some cases relative to the control coating formulations not containing SAMS.

In conclusion, a unique structured pigment has been presented that increases the amount of microvoids created in a coating formulation, which in turn has increased the light scattering capacity of the coating. This enhancement in light scattering effectively allows the removal of some titanium dioxide from the coating. Up to 50% removal of $TiO_2$ pigment was achieved with minimal deterioration of optical properties.

EXAMPLE 10

The SAMS product of Example 7 was tested in interior latex flat paint formulations and improvements in hiding power (contract ratio) and relative tinting strength were noted.

EXAMPLE 11

The SAMS products of the present invention were examined as a high brightness reinforcing filler in a white rubber formulation typical of those used for a white sidewall tire application. It was found that the product of the present invention provided modulus and tear properties equal to those of a Mercapto-treated clay. Improved rubber compound brightness and whiteness values result from superior capabilities in titanium dioxide extension.

The excellent reinforcement and optical performance properties of SAMS products, of the present invention, make these materials highly desirable fillers for white rubber formulations. In addition, the greater reinforcement properties of our new SAMS are unexpected given the prior art concepts of structure and performance. Example 12

Using the improved SAMS product of Example 7, combinations with fine particle size, hydrous clay in a range of from 5 to 50% can be used to replace $TiO_2$ in paperboard coatings that contain 5–50% $TiO_2$. This pigment combination provides optimum light scattering that allows replacement of as much as 60% of the $TiO_2$ in the coating while maintaining brightness. Hydrous clay is combined with this SAMS product to maintain other desirable properties such as gloss, printing, gluing, and smoothness. However hydrous clays alone do not provide the scattering that is needed to replace $TiO_2$. The example listed below show three combinations of hydrous clay and SAMS used to replace 20% to 60% of the $TiO_2$ in a coating formulation containing 25 parts of $TiO_2$ in a board formulation.

The above data show that the use of the improved SAMS of this invention in combination with a hydrous clay was able to maintain brightness and contrast ratio. This data was confirmed in a second experiment performed on a pilot coater. These results are presented in Table 8-B. These data show that brightness was improved while maintaining parameters such as gluing, gloss and print gloss.

It should be noted that slurry combinations of SAMS products with fine particle size hydrous clays have had previous utility in other coating related applications such as latex paints (as described in U.S. Pat. No. 5,112,402.) However, the SAMS pigments of greatest utility with hydrous clay for paint coatings were high structure, coarse particle size products (e.g., SAMHIDE 583 which has an oil absorption value of 150 g/100 g pigment, a TPV of 2.85 ml/gm and an average Stokes equivalent particle diameter of about 1.7 microns). In contrast, the SAMS/clay combinations most useful for board coating applications utilize the improved SAMS pigment of Example 7 which comparatively speaking is of lower structure and much finer particle size (see properties listed in Table 7). As taught in U.S. Pat. No. 5,112,402, the high structure SAMS used in SAMS/clay combinations for paints is greatly preferred because of the very low sheen and gloss properties desired for interior latex flat or for latex semi-gloss paint applications. A high structure SAMS pigment, like SAMHIDE 583, can not be used with clay in the above board coating formulations due to undesirable losses in gloss and gluing properties. Gluability is related directly to the binder demand of its coating pigments (which is generally reflected by their oil absorption values).

In summary, as solids in the SAMS reaction are increased the product particle size becomes coarser and pore structure broadens towards pore sizes of larger diameter. By using a unique combination of reduced agitator speed, extended ramp-up time and lower reaction temperature/pressure at higher solids an improved SAMS product having Total Pore Volume (TPV) on the order of 2.0–2.5 ml/gm., Differential Pore Volume (DPV) of at least 1.0 ml/gm and an average stokes equivalent particle diameter of 0.5–0.7 micron may be produced. A net increase in production throughput on the order of 40% is a further important result.

The present invention and the range of equivalents applicable thereto may perhaps best be summarized as follows:

The key to running at higher solids in accordance with the present invention is our lower reactor pressure/temperature conditions. The steam pressure range of utility is now 55–95 psig, with about 70 psig being most preferred. In contrast, the preferred SAMS products of U.S. Pat. Nos. 5,316,576 and 5,186,746 were made at steam pressures of 120–130 psig. Claim #10 of U.S. Pat. No. 5,316,576 specifies a range of 100 to 150 psig for producing SAMS products with what was then considered optimum pore structure.

The above patents focus on and accordingly claim reaction solids of 10–14 wt. % as being preferred, whereas now in the present invention the preferred solids range is 13–16 wt. % due to the use of lower operating pressure/temperature.

Preferred SAMS pigments produced at higher solids have a TPV of at least 2.0 ml/gm, but more preferably about 2.5 ml/gm, an oil absorption of less than 115 g/100 g pigment, an average Stokes equivalent particle diameter of 0.5–0.7 micron while also having a DPV value of at least 1.0 ml/gm. The previous patents generically stated that it was desirable to have pores in the 0.2–0.7 micron size range and more ideally near 0.3 micron; however, no effort was made to quantify the amount of optically efficient porosity actually present. It should be duly noted that the prior art SAMS satisfying our TPV, oil absorption and particle size criteria stated above in general provided DPV's less than 1.0 ml/gm.

The present invention uses a carefully selected combination of batch composition and reactor conditions allowing the products as specified to be obtained but doing so in such a manner as to operate at increased reactor solids of 13–16% for the purposes of increasing throughput and thereby lowering costs.

The most preferred reaction recipes to run at higher solids are those employing medium mole ratio sodium silicates having a $SiO_2/Na_2O$ molar ratio composition of from 2.0:1 to 2.5:1 (e.g., like D silicate) at B/C reaction ratios (molar basis) from 0.2 to 0.3 and using a hydrous clay feedstock having an average Stokes equivalent particle diameter of 0.2–0.3 micron.

The preferred SAMS pigments of the present invention yield upon makedown slurry products of 50% minimum solids having TPV and DPV values of at least 1.5 and 0.5 ml/gm.

The composite products of the present invention which combine our preferred SAMS and fine particle hydrous clays provide functionally in board coating applications.

While specific components have been referred to throughout as pan of the preferred embodiment of the present invention, any other suitable components or elements which perform the same function may be used.

While the present invention has been described with reference to specific embodiments, this application is intended to cover those various changes and substitutions which may be made by those skilled in the art without departing from the spirit and scope of the appended claims.

TABLE I-A

A Study of Sodium Silicate/Hydragloss 90 Clay Reactions Conducted Under Hydrothermal Conditions

| Sodium Silicate Reagent*<br>Reacted with HG-90 Clay | Base/Clay Molar<br>Ratios Examined | Reaction<br>Solids, **% |
|---|---|---|
| N (3.33 $SiO_2/Na_2O$ M.R.) | 0.1–0.5 | 12.0 |
| RU (2.47 $SiO_2/Na_2O$ M.R.) | 0.1–0.5 | 12.0 |
| D (2.06 $SiO_2/Na_2O$ M.R.) | 0.1–0.6 | 12.0 |
| BW-50 (1.65 $Si_2O/Na_2O$ M.R.) | 0.1–0.6 | 12.0 |
| Meta (1.0 $SiO_2/Na_2O$ M.R.) | 0.1–0.6 | 12.0 |

Note:
*All sodium silicates shown here are commercially available from PQ Corporation. The $SiO_2/Na_2O$ mole ratio composition of each silicate is shown in parenthesis.
**The hydrothermal conditions utilized in these reactions were as follows:
- 120 psig (172° C.),
- 1 hour cook time,
- 250 rpm mix speed in a 2-gallon laboratory Parr reactor.

TABLE 1-B

PIGMENT STRUCTURE DEFINITION AS BASED ON TOTAL PORE VOLUME*

| Pigment Structure<br>Level | Total Pore Volume,<br>ml/g |
|---|---|
| VHS (Very High Structure) | Above 3.3 |
| HS (High Structure) | 2.5–3.3 |
| MS (Medium Structure) | 1.6–2.5 |
| LS (Low Structure) | 0.8–1.6 |
| VLS (Very Low Structure) | Less than 0.8 |

*Values determined by Mercury Intrusion Porosimetry using a Micromeritics AutoPore-II 9220 unit. Pore volumes were determined over an intrusion pressure range of 10.0–6,029 psia. Data were collected using an advancing contact angle of 130 degrees and a pressure equilibration time of 10 seconds per intrusion measurement point.

TABLE 1-C

SAMS Products Illustrative of the Invention of
U.S. Pat. No. 5,186,746
Basic Physical Property Criteria:
i)  SAMS having an oil absorption value less than 115 g/100 g;
    but also having a total pore volume of at least 2.0 ml/g.
ii) A more preferred embodiment requires that the pigment
    pore volume consists only of pore diameters sized from 0.2
    to 0.7 micron.
Silicate/HG-90
Reactions*

| Sodium<br>Silicate | B/C Molar<br>Ratio | Oil Abs,<br>g/100 g | Total Pore<br>Volume, ml · g | Pore Size<br>Distrib.,**<br>Maxima<br>diameter<br>in microns |
|---|---|---|---|---|
| N | 0.2 | 88 | 2.42 | 0.41, 0.34 (sh) |
| RU | 0.2 | 80 | 2.17 | 0.30 |
| RU | 0.3 | 107 | 2.52 | 0.57, 0.36 |
| D | 0.2 | 77 | 2.03 | 0.30 |
| D | 0.3 | 98 | 2.31 | 0.53, 0.35 |
| BW-50 | 0.3 | 92 | 2.24 | 0.41, 0.33 (sh) |

TABLE 1-C-continued

| | | | | |
|---|---|---|---|---|
| BW-50 | 0.4 | 110 | 2.56 | 0.61, 0.45 |
| BW-50 | 0.5 | 101 | 2.54 | 0.63, 0.45 |
| Meta | 0.3 | 86 | 2.08 | 0.33, 0.28 (sh) |
| Meta | 0.4 | 105 | 2.25 | 0.42, 0.35 (sh) |
| Meta | 0.5 | 103 | 2.62 | 0.55, 0.40 (br) |

Note:
*Hydrothermal reactions from the study described in Table 1-A.
**Values determined by Mercury intrusion porosimetry. The designations (sh) and (br) denote "shoulder" and "broad distribution", respectively.

TABLE 2

Low Oil Absorption SAMS*
Produced from Various Clay Feedstocks

| SAMS Physical Property | Starting Clay Feedstock** | | | |
|---|---|---|---|---|
| | HG-90 | HG | HF-90 | Hydsp.-90 |
| Oil Absorption, g/100 g | 89 | 86 | 87 | 90 |
| BET Surface Area, $m^2/g$ | 22.1 | 21.8 | 17.9 | 15.3 |
| Total Pore Volume, ml/g | 2.33 | 2.26 | 2.14 | 2.04 |
| Pore Size Distribution (Population Maxima), diameter in micron | 0.30 | 0.30 | 0.60 | 0.79 |

Note:
*These products were produced from clay + D-Silicate reactions all conducted at a 0.2 base/clay molar ratio, 14% reaction solids, 120 psig (172° C.) cook over 1 hour and a 150 rpm Parr mix speed.
**The particle-size and brightness of the starting clay feedstocks were as follows:

| Clay | Average Stokes Equiv. Particle Dia., Micron | % Brightness |
|---|---|---|
| Hydragloss 90 | 0.2 | 91.0 |
| Hydragloss | 0.3 | 87.5 |
| Hydrafine 90 | 0.6 | 90.5 |
| Hydrasperse 90 | 0.7 | 90.0 |

TABLE 3

I. Influence of Reaction Solids
Reaction: Omnifil clay + D-Silicate reactions at 0.3 Base/Clay molar ratio, 120 psig (172° C.) cook over 1 hour with Parr mix speed of 150 rpm and the reactor solids ranging from 10–16%. D-Silicate (PQ Corp.) has a 2.06 $SiO_2/Na_2O$ mole ratio.

| SAMS Physical Property | Batch Reaction Solids % | | | |
|---|---|---|---|---|
| | 10 | 12 | 14 | 16 |
| Oil Absorption g/100 g | 99 | 101 | 103 | 99 |
| BET Surface Area, $m^2/g$ | 22 | 22 | 22 | 23 |
| Total Pore Volume, ml/g | 2.65 | 2.57 | 2.57 | 2.53 |
| Pore Size Distribution (Population Maxima), diameter in micron | 0.37 | 0.39, 0.33 | 0.44, 0.36 | 0.55, 0.33 |

II. Influence of Reactor Mixing Speed
Reaction: Hydragloss ™ 90 clay + D-Silicate reactions at 0.3 Base/Clay molar ratio, 120 psig (172° C.) cook over 1 hour, 14% solids, but with the Parr mixing speed varied from 150 to 250 and then finally to 350 rpm, respectively. D-Silicate (PQ Corp.) has a 2.06 $SiO_2/Na_2O$ mole ratio composition.

TABLE 3-continued

| SAMS Physical Property | Parr Reactor Mix Speed, rpm | | |
|---|---|---|---|
| | @150 | @250 | @350 |
| Sedigraph Particle Size, | | | |
| % - 2 microns | 70.0 | 61.5 | 57.5 |
| % - 1 micron | 47.5 | 41.0 | 35.0 |
| % - 0.5 micron | 22.5 | 19.0 | 15.0 |
| Oil Absorption, g/100 g | 94 | 105 | 106 |
| BET Surface Area, $m^2/g$ | 26 | 26 | 24 |
| Total Pore Volume, ml/g | 2.86 | 2.76 | 2.62 |

TABLE 4

Scale-Up of Low Oil Absorption SAMS Products

| Reaction Parameters | SAMS Reaction Products | | |
|---|---|---|---|
| | #1 | #2 | #3 |
| Clay Feedstock | HG-90 | HG-90 | HG-90 |
| Sodium Silicate* | D | D | Meta |
| Base/Clay Molar Ratio | 0.3 | 0.3 | 0.5 |
| Reaction Solids, % | 10 | 10 | 10 |
| Reaction Pressure, psig | 120 (172° C.) | 120 (172° C.) | 120 (172° C.) |
| Cook Time Hrs. | 1.0 | 1.0 | 1.0 |
| Mixing Speed, rpm (fpm tip speed) | 41 (182 fpm) | 54 (240 fpm) | 54 (240 fpm) |
| Material Batch Sheet | | | |
| Batch Water, lbs. | 986.0 | 986.0 | 933.4 |
| Silicate, lbs. | 71.6 | 71.6 | 31.8 |
| HG-90 Slurry (67% solids), lbs. | 217.9 | 217.9 | 200.6 |
| Initial Solids, % | 13.9 | 13.9 | 14.3 |
| Steam Condensate, lbs. | 500.2 | 500.2 | 500.2 |
| Batch Total lbs. | 1775.7 | 1775.7 | 1666.0 |

Note:
*D-Silicate (PQ Corp.) has a 2.06 $SiO_2/Na_2O$ mole ratio composition, meta (Metso 2048) has a 1.0 mole ratio.

| Product Physical Properties | #1 | #2 | #3 |
|---|---|---|---|
| Sedigraph Particle Size, | | | |
| % - 2 microns | 87.0 | 78.0 | 86.0 |
| % - 1 micron | 66.5 | 55.0 | 65.0 |
| % - 0.5 micron | 42.5 | 35.5 | 37.0 |
| Average Stokes Equivalent Particle Diameter, micron | 0.60 | 0.82 | 0.66 |
| Oil Absorption, g/100 g pigment | 108 | 112 | 109 |
| Total Pore Volume, ml/g | 2.66 | 2.62 | 2.70 |

TABLE 5-A

Comparison of Typical Properties:
Commercial-Scale SAMS Products vs.
Hydragloss 90 Feedstock

| Chemical Analysis, % | Hydragloss 90 Clay | SAMTONE 581** | Low Oil Abs. SAMS |
|---|---|---|---|
| $TiO_2$ | 0.94 | 0.51 | 0.50 |
| $Fe_2O_3$ | 0.98 | 0.83 | 0.80 |
| $SiO_2$ | 44.79 | 54.57 | 47.74 |
| $Al_2O_3$ | 38.37 | 27.95 | 34.66 |
| $Na_2O$ | 0.03 | 6.75 | 3.23 |
| $H_2O$ (% LOI)* | 13.86 | 10.71 | 12.23 |
| XRD | Kaolinite | Attenuated Kaolin | Attenuated Kaolin |

TABLE 5-A-continued

Physical Properties:

| | | | |
|---|---|---|---|
| Total Pore Volume, ml/g | | | |
| Pore Size Distribution (Population Maxima), diameter in micron | 0.85 | 0.35 | 0.40 |
| BET Surface Area, $m^2/g$ | 22.0 | 21.5 | 22.0 |
| pH (at 20% solids) | 6.8 | 11.2 | 10.6 |
| Oil Absorption, g/100 g pigment | 40 | 150 | 105 |
| Einlehner Abrasion, mg wire loss/100 g | 4.0 | 3.5 | 2.8 |
| Brightness, % | 91.4 | 92.6 | 92.2 |
| Specific Gravity | 2.60 | 2.43 | 2.52 |
| Sedigraph Particle Size, % - 2 microns | 98.0 | 61.0 | 84.0 |

Note:
*LOI = Loss on Ignition (@ 925° C.)
**Pigment of Example Two per U.S. Pat. No. 4,863,796.

TABLE 5-B

The Effect of Reactor Steam Flow on SAMS Product Formation

Commercial Scale Production of Low Oil Absorption SAMS

| Reaction Parameters | Targeted Product (84% - 2m particle size) | SAMS w/70% - 2m particle size |
|---|---|---|
| Initial Steam Flow (into reactor), lbs./hr. | 30,500 | 30,500 |
| Intermediate Pressure Point*, Steam Reduction @ psi | −50% @ 55 psi | None (linear Pressure - up profile) |
| Ramp-Up Time, min. | 35 | 27 |
| Final Cook Pressure, psig | 130 | 130 |
| Cook Time, min. | 65 | 65 |
| Reactor Mix Speed, rpm (fpm tip speed) | 8 (100.5) | 8 (100.5) |

Note:
*Point during the ramp up phase where the steam flow is quickly reduced a set percentage by means of an automated steam control valve.

TABLE 7

Comparative Reaction Parameters and Physical Properties for SAMS Structured Pigments

| Pigment ID: | A<br>SAMS of Example 5**<br>(Spray-dried SAMS filter cake product) | B<br>SAMS of Example 7<br>(Spray-dried SAMS filter cake product) |
|---|---|---|
| General Pigment Description | SAMS produced via high pressure hydrothermal reaction with Sodium Silicate | SAMS produced via low pressure hydrothermal reaction with Sodium Silicate |
| Critical Reaction Parameters: | | |
| Clay Feedstock | HG-90 | HG-90 |
| Sodium Silicate | D (2.06 M.R.) | D (2.06 M.R.) |
| B/C Molar Ratio | 0.3 | 0.3 |
| Total Reaction Solids, % | 10.0 | 14.0 |
| Ramp-Up Time, min. | 35 | 45 |
| Final Temp./Pressure Conditions | 175° C./130 psig | 150° C./70 psig |
| Cook Time, min. | 65 | 45 |
| Reactor Mix Speed, rpm | 8 | 8 |
| Typical Physical Properties: | | |
| Specific Gravity | 2.52 | 2.52 |
| Sedigraph Particle Size: | 0.60 | 0.65 |
| Malvern Median Particle Size | 5.2 | 5.4 |
| Malvern Specific | 1.20 | 1.15 |
| Pigment Brightness, % | 92.2 | 92.0 |
| Oil Absorption | 105 | 95 |
| BET Surface Area, | 22.0 | 21.5 |
| Total Pore Volume (TPV), | 2.85 | 2.54 |
| Differential Pore Volume | 0.90 | 1.1 |

Note:
*LLS Method = particle size analysis based on laser light scattering
**SAMS of Example 5 = sodium aluminosilicate product as per prior art of U.S. Pat. No. 5,186,746 (1993).

TABLE 8-A

Drawdown Results of Board Coating Formulations

| Ingredients | Coating A | Coating B | Coating C | Coating D |
|---|---|---|---|---|
| Hydrous Clay | 75 | 60 | 64 | 45 |
| TiO$_2$ | 25 | 20 | 15 | 10 |
| SAMS of Example 7 | — | 20 | 21 | 45 |
| Binder | 21 | 21 | 21 | 21 |
| Solids, % | 48 | 48 | 48 | 48 |
| Brightness White Area | 82.5 +/− 0.3 | 88.7 +/− 0.3 | 88.2 +/− 0.3 | 89.6 +/− 0.3 |
| Brightness Black Area | 81.2 +/− 0.3 | 88.0 +/− 0.3 | 87.1 +/− 0.3 | 89.0 +/− 0.3 |
| Contrast Ratio | 0.992 | 0.991 | 0.987 | 0.993 |

TABLE 8-B

Results from Laboratory Pilot Coater

| Ingredients | Coating A | Coating B | Coating C |
|---|---|---|---|
| TiO2 | 25 | 15 | 10 |
| Clay | 75 | 64 | 69 |
| SAMS of Example 7 | — | 21 | 21 |
| Binder | 21 | 25 | 25 |
| Solids, % | 48 | 48 | 48 |
| Properties: | | | |
| Brightness (+/−0.3) | 69.1 | 72.7 | 71.3 |
| Whiteness | 66.5 | 73.5 | 71.5 |
| Yellowness | 0.98 | −0.65 | −0.43 |
| Gloss (+/−1) | 21.8 | 32.4 | 32.5 |
| IGT cm/sec (medium oil) | >180 | 140 | 155 |
| Print Gloss (+/−2) | 57.2 | 61.2 | 62.1 |
| Parker Print Surf (+/−0.1) | | | |
| @ 5 Kgf | 6.15 | 5.90 | 5.25 |
| @ 10 Kgf | 4.67 | 4.49 | 4.11 |
| @ 20 Kgf | 3.52 | 3.35 | 3.04 |
| K&N (+/−0.5) | 85.07 | 90.22 | 89.62 |
| Gluing *(+/−1) | 5 | 5 | 5 |
| Coat Weight, gsm | 26.89 | 27.87 | 26.40 |
| lbs/1000 ft2 | 5.5 | 5.7 | 5.4 |

*Gluing was measured based on Fiber Tear (0–5) with 0 = no fiber tear and 5 being complete fiber tear.

We claim:

1. A sodium alumino-silicate pigment having the following empirical formula in terms of oxide constituents:

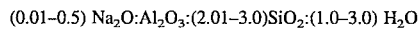

(0.01–0.5) Na$_2$O:Al$_2$O$_3$:(2.01–3.0)SiO$_2$:(1.0–3.0) H$_2$O said pigment being produced by the hydrothermal reaction of a sodium silicate and a clay in an aqueous medium at a molar ratio of sodium silicate (B) to clay (C) of 0.1:1 to 0.5:1, said pigment having a total pore volume of at least 2.0 ml/gm, an oil absorption of less than about 115 gm/100 gm, a median particle size of 0.5–0.7 microns, as determined by x-ray sedigraph, and a differential pore volume greater than 1.0 ml/gm.

2. A paper composition containing the sodium alumino-silicate pigment of claim 1.

3. A paint composition containing the sodium alumino-silicate pigment of claim 1.

4. A rubber composition containing a rubber and the sodium alumino-silicate pigment of claim 1.

5. A composite pigment blend containing from 5 to 50% by weight of the sodium alumino-silicate pigment of claim 1 with the balance being a clay.

6. A paper coating composition containing the sodium alumino-silicate pigment of claim 1.

7. An aqueous slurry product comprising at least 50% solids by weight of the sodium alumino-silicate pigment of claim 1, the aqueous slurry product having a total pore volume of about 1.5 ml/mg, a median particle size of about 0.2–0.5 microns as determined by x-ray sedigraph and a different pore volume of at least 0.5 ml/gm.

8. A board coating pigment blend containing from 5 to 50% by weight of the aqueous slurry product of claim 7 with the balance being a clay having a brightness greater than 90 and a median particle size less than 0.8 microns as determined by x-ray sedigraph.

9. A paper composition containing a filler pigment, derived from the aqueous slurry product of claim 7.

10. A paper coating composition containing a coating pigment derived from the aqueous slurry product of claim 7.

11. An aqueous slurry product containing 5 to 50% by weight of the aqueous slurry product of claim 7 with the balance being a clay.

12. A sodium alumino-silicate product comprising structured agglomerants produced by the reaction of sodium silicate (B) and kaolin clay (C) under hydrothermal conditions at a B/C molar ratio of 0.1:1 to 0.5:1; said structured agglomerants having (a) a total pore volume of greater than 2.0 ml/gm, which represents the sum of the microvoids within the structured agglomerants, the diameter size of the microvoids being centered near 0.3 microns for the efficient scattering of visible light;

(b) an oil absorption of less than 115 gm/100 gm; and (c) a median particle size of about 0.5 to 0.7 microns as determined by x-ray sedigraph with about 85% of the particles being less than 2 microns, and;

(d) a differential pore volume greater than 1.0 ml/gm.

13. A method for the preparation of sodium aluminosilicate pigments which have a pore diameter size distribution centered near 0.3 micron for efficient scattering of visible light, which comprises:

(a) providing a clay which has a median particle size of about 0.1 to 0.5 micron based on x-ray sedigraph measurements;

(b) providing a sodium silicate solution which has a SiO$_2$/Na$_2$O mole ratio of about 1.0:1 to 3.33:1;

(c) conducting a first reaction by mixing the clay with the sodium silicate solution in an aqueous medium to form a batch reaction mixture with a total solids content ranging between about 13 and 16% wherein the total solids content is the weight concentration of all inorganics in the batch reaction mixture and, at a molar ratio of sodium silicate (B) to clay (C) of 0.1:1 to 0.5:1, and heating the batch reaction mixture in the presence of steam to a temperature/pressure target up to 164° C./100 psig to form structured agglomerants comprising agglomerated small flat platelets and the structured agglomerants having a differential pore volume greater than 1.0 ml/gm;

(d) conducting a second reaction for a sufficient period of time at the temperature/pressure target to form an integrated rimmed area of amorphous non-diffracting sodium silicate clay reaction product on the small, flat platelets and to increase the brightness of the structured agglomerants as compared to the brightness of the clay.

14. The method of claim 13, wherein the steam pressure ranges between about 55 and 95 psig.

15. The method of claim 13 wherein the steam pressure is about 70 psig.

16. The method of claim 13 wherein the sodium silicate $SiO_2/Na_2O$ molar ratio composition is from 2.0:1 to 2.5:1.

17. The method of claim 13 wherein the molar base/clay (B/C) reaction ratios are from 0.2 to 0.3.

18. The method of claim 13 wherein the clay has a median particle size of 0.2–0.3 microns as determined by X-ray sedigraph.

19. The method of claim 13 wherein the first reaction step is about 45 minutes and the second reaction step is about 45 minutes.

20. The method of claim 13 wherein the steam pressure is about 70 psig; the sodium silicate $SiO_2/Na_2O$ molar ratio composition is from 2.0:1 to 2.5:1; the molar base/clay (B/C) reaction ratio is from 0.2 to 0.3; the clay has a median particle size of 0.2–0.3 microns as determined by X-ray sedigraph; the first reaction step lasts about 45 minutes; and the second lasts about 45 minutes; and the second reaction step lasts about 45 minutes.

21. The method of claim 13 wherein the structured agglomerants from step (d) are subsequently made into a slurry product of 50% minimum solids having a total pore volume of at least 1.5 ml/gm and a differential pore volume of at least 0.5 ml/gm.

22. A board coating pigment blend comprising a slurry produced by the method of claim 21.

23. A method of board coating comprising the steps of applying a coating to board, the improvement comprising selecting a coating comprising about 5 to 50% by weight of a sodium alumino-silicate pigment produced in accordance with claim 21 with the balance being a clay having a brightness greater than 90 and a median particle size less than 0.8 microns as determined by x-ray sedigraph.

24. A method for the preparation of sodium alumino-silicate pigments which have a pore diameter size distribution centered near 0.3 microns for efficient scattering of visible light, which comprises:

(a) selecting a clay starting material which has a median particle size in microns as determined by X-ray sedigraph which is comparable to the pore diameter size necessary for efficient scattering of visible light;

(b) reacting a sodium silicate solution (B) with said clay starting material (C) in an aqueous medium under hydrothermal conditions at a total solids content between about 13 and 16%, wherein the total solids content is the weight concentration of all inorganics in the reacting step and at temperatures/pressures less than 164° C. 100 psig to produce an agglomerated reaction product having a median particle size of about 0.5 to 0.7 microns as measured by x-ray sedigraph; and (c) recovering said agglomerated reaction product, said agglomerated product being composed of agglomerated small flat platelets, said agglomerated products having a differential pore volume greater than 1.0 ml/gm.

25. The method of claim 24 wherein the clay starting material is a hydrous clay having a median particle size of about 0.1 to 0.5 microns as determined by x-ray sedigraph.

26. The method of claim 24 wherein the sodium silicate solution and the clay starting material are reacted in a molar ratio of (B) to (C) of 0.1:1 to 0.5:1.

27. The method of claim 24 wherein the sodium silicate solution has a $SiO_2/Na_2O$ mole ratio composition of about 1.0:1 to 3.33:1.

28. The method of claim 24 wherein the temperatures/pressures are about 150° C./70 psig.

29. The method of claim 24 wherein the agglomerated reaction product is subjected to temperatures/pressures of less than 164° C./100 psig for a period of time to form said small flat platelets with an integrated rimmed area of amorphous non-diffracting sodium silicate clay reaction product.

\* \* \* \* \*